United States Patent [19]

Yamabe et al.

[11] 4,178,890

[45] Dec. 18, 1979

[54] DECELERATION CONTROL APPARATUS FOR VEHICLE ENGINE

[75] Inventors: Hitoshi Yamabe, Saitama; Syoichi Otaka, Miyoshi; Masao Watanabe, Asaka, all of Japan

[73] Assignee: Honda Giken Kogyo Kabushiki Kaisha, Tokyo, Japan

[21] Appl. No.: 858,841

[22] Filed: Dec. 8, 1977

Related U.S. Application Data

[63] Continuation of Ser. No. 702,053, Jul. 2, 1976, abandoned.

[30] Foreign Application Priority Data

Jul. 8, 1975 [JP] Japan .................................. 50-83129

[51] Int. Cl.² ............................................. F02D 11/08
[52] U.S. Cl. .............................. 123/103 R; 123/103 E; 123/97 B; 261/DIG. 18
[58] Field of Search .............. 123/97 B, 103 R, 103 B, 123/103 C, 103 E, 97 R; 261/DIG. 18, DIG. 19

[56] References Cited

U.S. PATENT DOCUMENTS

| 2,134,889 | 11/1938 | Phillips | 123/103 R |
|---|---|---|---|
| 2,395,748 | 2/1946 | Mallory | 123/97 R |
| 2,505,292 | 4/1950 | Mallory | 123/103 R |
| 2,588,136 | 4/1952 | Mallory | 123/103 R |
| 2,692,651 | 10/1954 | Ball | 180/77 |
| 2,993,484 | 7/1961 | Gallman | 123/97 B |
| 3,327,695 | 6/1967 | Rhodes | 123/103 R |
| 3,596,642 | 8/1971 | Nakata | 123/97 B |
| 3,955,364 | 5/1976 | Lewis | 123/97 B |

FOREIGN PATENT DOCUMENTS

| 1955031 | 5/1971 | Fed. Rep. of Germany | 123/97 B |
|---|---|---|---|
| 2233502 | 2/1975 | France | 123/103 R |

Primary Examiner—Charles J. Myhre
Assistant Examiner—Craig R. Feinberg
Attorney, Agent, or Firm—Lyon & Lyon

[57] ABSTRACT

Deceleration control apparatus for a vehicle engine minimizes increase in exhaust pollutants during sudden deceleration while at the same time maintaining effective braking action of the engine to reduce the speed of the vehicle. In addition to a dash pot mechanism subjected to vacuum pressures both upstream and downstream from the engine throttle valve for regulating closing movement of the throttle valve, an air passage communicates with the engine intake passage downstream from the throttle valve. A control valve is operatively interposed in the air passage to admit atmospheric air into the engine intake passage upon sudden deceleration in engine speed. The control valve closes slowly during continued deceleration and closes off the air supply when deceleration ceases.

4 Claims, 2 Drawing Figures

DECELERATION CONTROL APPARATUS FOR VEHICLE ENGINE

This is a continuation of application Ser. No. 702,053, filed July 2, 1976, now abandoned.

This invention relates to deceleration controls for internal combustion engines used in motor vehicles. It is known that sudden deceleration in engine speed results in an increase in pollutants discharged into the atmosphere with the engine exhaust gases. However, when attempts have been made to correct this undesirable result by retarding the closing action of the throttle valve in the engine intake passage, another difficulty is encountered, namely, the desirable braking effect of the engine to reduce vehicle speed is adversely affected. It is an important object of the present invention to provide deceleration control apparatus which minimizes increase in discharge of pollutants into the atmosphere, while at the same time retaining a major portion of the desirable engine braking effect.

Other and more detailed objects and advantages will appear hereinafter.

Figure 1:
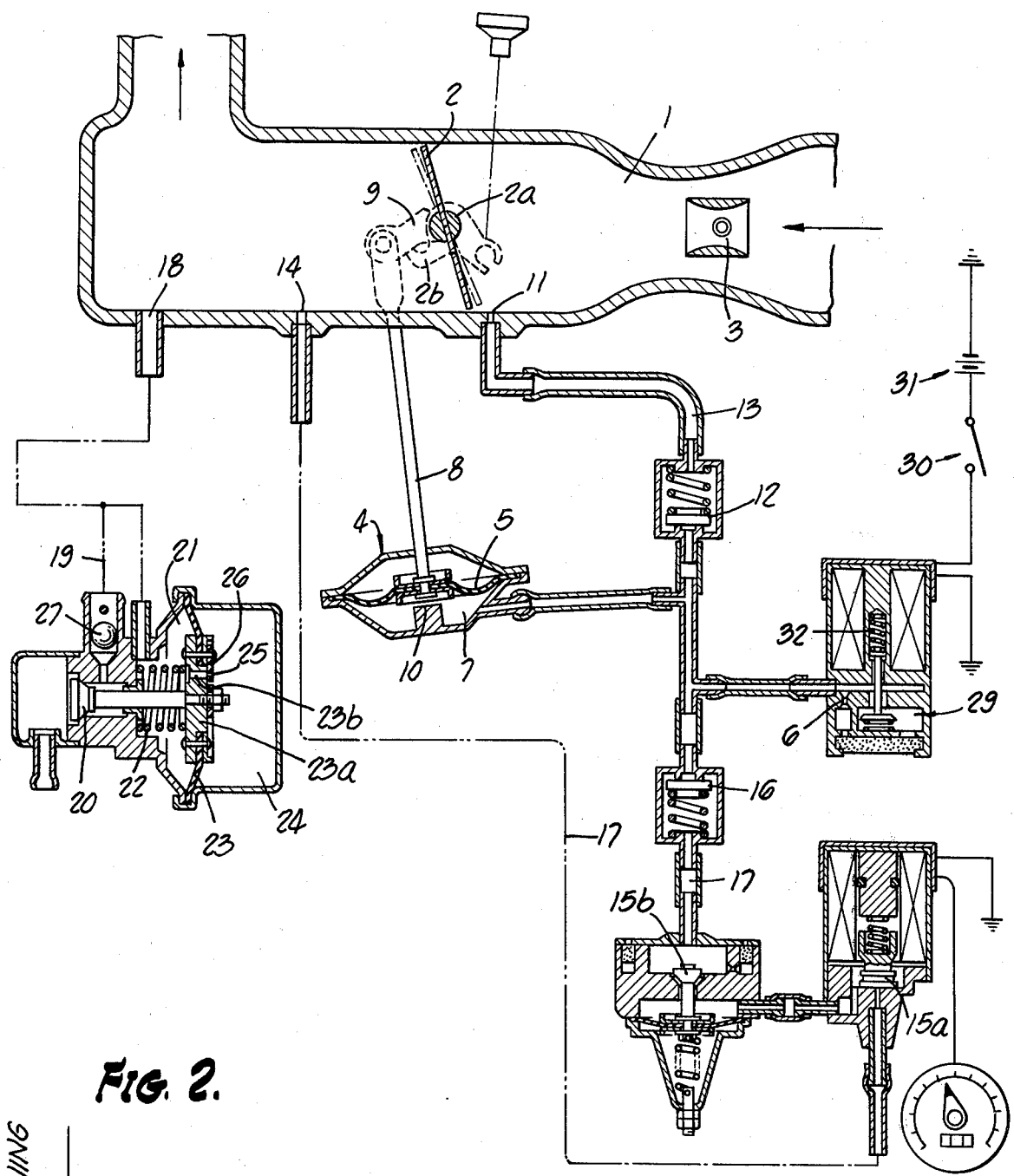
FIG. 1 is a sectional schematic diagram showing a preferred embodiment of this invention.

Referring to the drawings, the intake passage 1 is connected to an internal combustion engine, not shown. A throttle valve 2 is mounted within the passage 1 and a venturi 3 is located within the intake passage 1 upstream from the throttle valve 2. A dash pot generally designated 4 operates in association with the throttle valve 2 to limit its speed of movement near its minimum opening position. This dash pot 4 includes a flexible diaphragm 5 which forms one wall of the vacuum chamber 7. The vacuum chamber 7 is connected to atmosphere through a restricted passage 6 of the leak jet type. The diaphragm 5 is connected by rod 8 which in turn is pivotally connected to arm 9. The arm 9 is mounted to turn about the axis of the throttle valve shaft 2a. The dash pot 4 also contains an abutment 10 which limits retracting movement of the rod 8. A projection 2b is fixed to the throttle valve shaft 2a and engages the pivoted arm 9. The parts are proportioned so that closing movement of the throttle valve 2 within a few degrees of its minimum opening position is accompanied by movement of the rod 8 and the diaphragm 5. The connection between the parts 2b and 9 may therefore be described as an angular lost-motion connection. The diaphragm 5 never resists opening movement of the throttle valve 2.

A first vacuum outlet 11 of relatively small diameter, for example about 1 mm, is provided at the side of the intake passage 1 at a location slightly upstream of the adjacent portion of the throttle valve 2 at its minimum opening position. This vacuum outlet 11 is connected through check valve 12 in passage 13 to the vacuum chamber 7. From this description it will be understood that, when the engine is running and when the throttle valve 2 is near its minimum opening position, relatively high vacuum is produced in the passage 13, opening check valve 12, and causing the diaphragm 5 to act in a direction to open the throttle valve 2.

At one side of the intake passage 1 and at a location on the downstream side of the throttle valve 2 a second vacuum outlet 14 is provided which is connected to the vacuum chamber 7 through a second vacuum passage 17. In this second vacuum passage 17 is located a speed responsive valve 15a that opens by detecting relatively high rpm of the engine. Also positioned in this passage 17 is a vacuum response valve 15b that opens under high vacuum pressure, and a check valve 16. Accordingly, when the dash pot 4 controls closing operation of the throttle valve 2, vacuum that is generated on the downstream side of the throttle valve 2 acts through the second vacuum outlet 14 and second vacuum passage 17 to said vacuum chamber 7 to act as a throttle opener. Decrease of engine speed or reduction in vacuum intensity closes the passage 17. Thereafter the dash pot 4 performs its normal operation to control the closing characteristics of throttle valve 2, and these are shown by the line A in FIG. 2 of the drawings.

Figure 2:
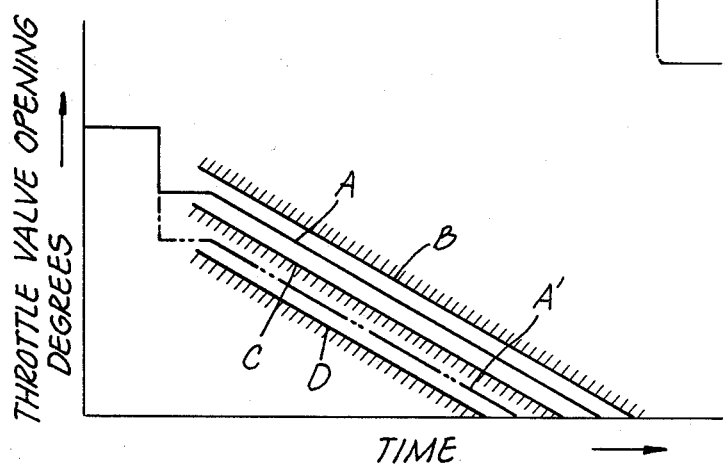
FIG. 2 is a graph showing closing characteristics of the throttle valve.

The closing characteristics of the throttle valve 2 should lie, as shown by line A in FIG. 2, between area B at the upper side where the braking action of the engine is ineffective, and area C at the lower side where exhaust pollutants reach unacceptable levels. If area C at the lower side is further displaced downward to area D, for instance, line A can be shifted to line A' for move effective engine brake action and improved driveability. It is desirable that exhaust pollutants be prevented from marked increase during sudden deceleration, and to accomplish this, means are provided, in accordance with the present invention, to introduce atmospheric air into the intake passage 1 during sudden deceleration.

At the side of the intake passage 1 and at a location downstream from the throttle valve 2, an opening 18 is provided which is connected to atmosphere through air passage 19. A control valve 20 is interposed in the air passage 19 and this control valve 20 opens when the vacuum intensity at the opening 18 increases suddenly, and allows atmospheric air to enter the intake passage 1 through the opening 18. The control valve 20 is connected to a movable member 23a mounted on an annular flexible diaphragm 23 and is normally moved to its closed position by a spring 22. A vacuum chamber 21 is formed on one side of the diaphragm 23 and a closed chamber 24 is formed on the other side. A flapper 26 mounted on the movable member 23a serves as a check valve for the opening 23b. A small orifice 25 is provided in the flapper 26 in alignment with the opening 23b. The air passage 19 is connected directly to the vacuum chamber 21 and is also connected to control valve 20 through the ball check valve 27 which affords protection to the valve 20 in the case of backfire.

In operation, sudden increase in vacuum intensity at the opening 18 causes the diaphragm 23 to open the valve 20 at once against the spring 22, the flapper 26 remaining closed. Atmospheric air may then pass the ball check valve 27 through passage 19 and into the intake passage 1 through the opening 18. Continued deceleration allows air to pass from the closed chamber 24 to the vacuum chamber 21 through the orifice 25, whereby the control valve 20 is closed slowly by the spring 22 to reduce the rate of air input through opening 18. When deceleration is discontinued, the spring 22 moves the diaphragm 23 to close the valve 20, and the flapper 26 opens to permit flow of air from the chamber 21 through the opening 23b into the closed chamber 24.

The control valve 20 is placed at a location higher than that of the opening 18; a location 80 mm or more higher, for instance, prevents fuel in the air-fuel mixture from collecting in the control valve 20.

The solenoid operated valve 29 associated with the restricted passage 6 is connected through an ignition switch 30 to a battery 31. When the ignition switch 30 is opened, the valve 29 is opened by a spring 32 and admits the air into the vacuum chamber 7. In other words, when the engine stops, the throttle valve 2 is brought to idling position without the operation of the dash pot 4 to prevent run-on operation of the engine.

In accordance with the present invention, a sudden deceleration of the engine causes the control valve 20 to open at once by means of the vacuum pressure generated on the downstream side of the throttle valve 2, so that atmospheric air is introduced through the control valve 20 into the intake passage 1. This results in better combustion in the engine and the consequent prevention of worsening of exhaust emissions during deceleration. Also, the closing characteristics of the throttle valve 2 produce a more effective braking action by the engine during deceleration, and improve driveability.

Having fully described our invention, it is to be understood that we are not to be limited to the details herein set forth but that our invention is of the full scope of the appended claims.

We claim:

1. Deceleration control apparatus for a vehicle engine having a throttle valve mounted in an intake passage, the improvement comprising, in combination: a dash pot mechanism having a diaphragm operatively connected to said throttle valve, a vacuum chamber having a wall thereof formed by said diaphragm, a vacuum outlet positioned slightly upstream of the adjacent portion of the throttle valve at its minimum opening position, a vacuum passage connected between said vacuum chamber and said vacuum outlet, a check valve positioned in said vacuum passage opening on increased vacuum intensity in said vacuum outlet, a restricted passage connecting said vacuum chamber to atmosphere, an air passage communicating with said intake passage downstream from the throttle valve, a control valve operatively interposed in said air passage and having a movable valve element, pressure responsive means including a movable member for moving said valve element between open and closed position, said pressure responsive means including a vacuum chamber on one side of said movable member subjected to pressure in said air passage, means providing a closed chamber on the other side of said movable member, and valve means on the movable member acting to restrict flow from the closed chamber to the vacuum chamber while permitting relatively unrestricted flow in the opposite direction, whereby the control valve is opened quickly upon increase in vacuum intensity in said air passage to permit flow of atmospheric air into the engine intake passage, said control valve closing relatively slowly upon reduction of vacuum intensity in said air passage.

2. Deceleration control apparatus for a vehicle engine having a throttle valve mounted in an intake passage, the improvement comprising, in combination: a dash pot mechanism having a diaphragm operatively connected to said throttle valve, a vacuum chamber having a wall thereof formed by said diaphragm, a first vacuum outlet positioned slightly upstream of the adjacent portion of the throttle valve at its minimum opening position, a first vacuum passage connected between said vacuum chamber and said vacuum outlet, a first check valve positioned in said first vacuum passage and opening upon increased vacuum intensity at said first vacuum outlet, a restricted passage connecting said vacuum chamber to atmosphere, a second vacuum outlet positioned downstream from said throttle valve, a second vacuum passage connecting said vacuum chamber to said second vacuum outlet, and a check valve positioned in said second vacuum passage, whereby the vacuum from said first vacuum passage to said vacuum chamber activates said dash pot mechanism, and whereby the vacuum from said second vacuum passage to said vacuum chamber causes said diaphragm to act as a throttle opener, an air passage communicating with said intake passage downstream from the throttle valve, a control valve operatively interposed in said air passage and having a movable valve element, pressure responsive means including a movable member for moving said valve element between open and closed position, said pressure responsive means including a vacuum chamber on one side of said movable member subjected to pressure in said air passage, means providing a closed chamber on the other side of said movable member, and valve means on the movable member acting to restrict flow from the closed chamber to the vacuum chamber while permitting relatively unrestricted flow in the opposite direction, whereby the control valve is opened quickly upon increase in vacuum intensity in said air passage to permit flow of atmospheric air into the engine intake passage, said control valve closing relatively slowly upon reduction of vacuum intensity in said air passage.

3. Deceleration control apparatus for vehicle engine having a throttle valve mounted in an intake passage, the improvement comprising, in combination: a dash pot mechanism having a diaphragm operatively connected to said throttle valve and a vacuum chamber, a first vacuum passage connected between said vacuum chamber and a first vacuum outlet positioned slightly upstream of the adjacent portion of the throttle valve at its minimum opening position, a first check valve positioned in said first vacuum passage, a restricted passage connecting said vacuum chamber to atmosphere, a second vacuum passage connected between said vacuum chamber and second vacuum outlet positioned downstream side of the throttle valve, a check valve positioned in said second vacuum passage, an air passage communicating with said intake passage downstream from the throttle valve, a control valve operatively interposed in said air passage and having a movable valve element, pressure responsive means including a movable member for moving said valve element between open and closed position, said pressure responsive means including a vacuum chamber on one side of said movable member subjected to pressure in said air passage, means providing a closed chamber on the other side of said movable member, and valve means on the movable member acting to restrict flow from the closed chamber to the vacuum chamber while permitting relatively unrestricted flow in the opposite direction, whereby the control valve is opened quickly upon increase in vacuum intensity in said air passage to permit flow of atmospheric air into the engine intake passage, said control valve closing relatively slowly upon reduction of vacuum intensity in said air passage.

4. Deceleration control apparatus for a vehicle engine having a throttle valve mounted in an intake passage, the improvement comprising, in combination: a dash pot mechanism having a diaphragm operatively connected to said throttle valve, a vacuum chamber having a wall thereof formed by said diaphragm, a first vacuum outlet positioned slightly upstream of the adjacent portion of the throttle valve at its minimum opening position, a first vacuum passage connected between said vacuum chamber and said vacuum outlet, a first check valve positioned in said vacuum passage and opening upon increased vacuum intensity at said first vacuum outlet, a restricted passage connecting said vacuum chamber to atmosphere, a second vacuum outlet positioned downstream from said throttle valve, a second vacuum passage connecting said vacuum chamber to said second vacuum outlet, an air passage communicating with said intake passage downstream from the throttle valve, a control valve operatively interposed in said air passage and having a movable valve element, pressure responsive means including a movable member for moving said valve element between open and closed position, said pressure responsive means including a vacuum chamber on one side of said movable member subjected to pressure in said air passage, means providing a closed chamber on the other side of said movable member, and valve means on the movable member acting to restrict flow from the closed chamber to the vacuum chamber while permitting relatively unrestricted flow in the opposite direction, whereby said control valve is opened quickly upon increase in vacuum intensity in said air passage to permit flow of atmospheric air into the engine intake passage, said control valve closing relatively slowly upon reduction of vacuum intensity in said air passage.

* * * * *